May 5, 1925
1,536,898
R. LORENZ
CAN OPENER AND CLOSURE
Filed Feb. 20, 1924
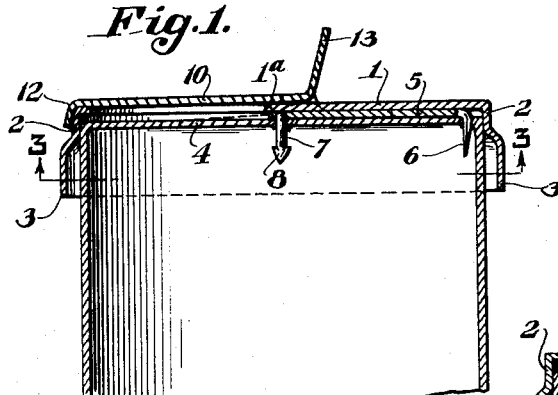
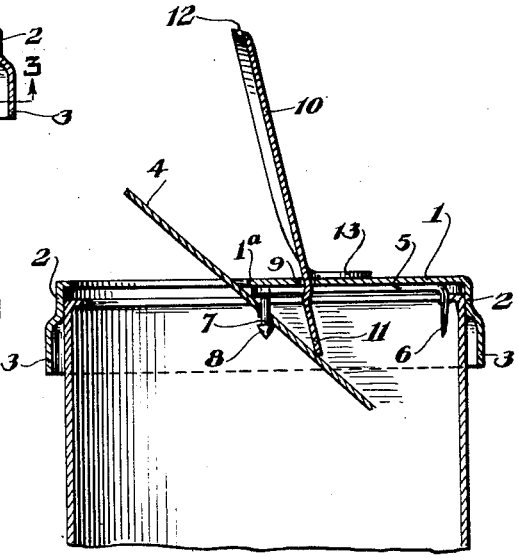
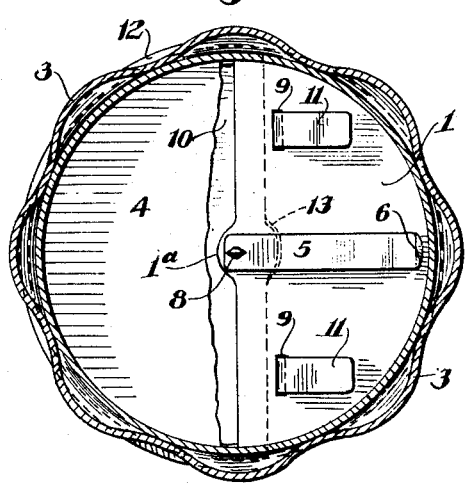
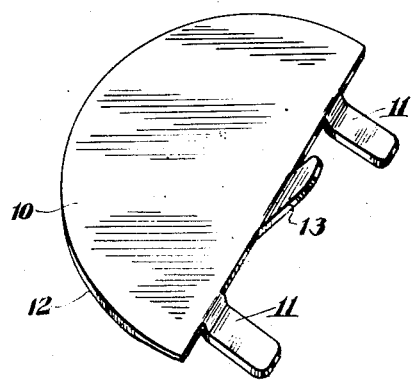
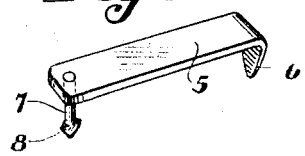
WITNESSES
Louis Goodman
Howard D. Orr
INVENTOR
Robert Lorenz
BY
ATTORNEY Patented May 5, 1925.

1,536,898

UNITED STATES PATENT OFFICE.

ROBERT LORENZ, OF BROOKLYN, NEW YORK.

CAN OPENER AND CLOSURE.

Application filed February 20, 1924. Serial No. 694,062.

*To all whom it may concern:*

Be it known that I, ROBERT LORENZ, a citizen of the United States, residing at Brooklyn, in the county of Kings and State of New York, have invented new and useful Improvements in Can Openers and Closures, of which the following is a specification.

This invention relates to can openers and closures.

The object is to combine in a simple and cheaply manufactured device of this character, means for severing the heads of milk or other cans and removing the same from the can while the device is positioned thereon, the device to remain as a closure for the same until the contents of the can have been used.

Another object is to provide a device which may be readily applied to the top of a can and by simple rotating movement cause the head of the can to be removed, said device having a pouring opening through which the contents may be removed in the desired amounts, and having a cover or lid to automatically close said opening to keep the contents of the can in a sanitary condition when not in use.

A final object is to provide a cover or lid for the pouring opening which may be readily removed from the device for the purpose of cleansing the same, said lid having means for automatically tilting the severed can top to place the same within reach of the fingers for removal from the can, when the said lid is raised to uncover the pouring opening.

A full and complete understanding of the invention may be obtained from a consideration of the following detailed description, taken in connection with the accompanying drawing forming a part of this specification; it being understood that while the drawing shows a practical form of the invention, the latter is not to be confined to strict conformity with the showing thereof, but may be changed or modified, so long as such changes or modifications mark no material departure from the salient features of the invention, as specifically pointed out in the appended claims.

In the drawings, in which similar reference characters designate corresponding parts throughout the several figures:

Figure 1 is a vertical section through the upper portion of a can and showing the improved can opener and closure in position thereon, the lid being closed, prior to the severing of the can top.

Figure 2 is a similar view after the can top has been severed and the lid elevated to tilt the severed top to be grasped and removed from the can.

Figure 3 is a horizontal sectional view taken on the line 3—3 of Figure 1 and looking in the direction of the arrows.

Figure 4 is a detail perspective view of the detachable lid.

Figure 5 is a detail perspective view of the can puncturing pin and blade member.

The improved can opener and closure may be made in different sizes to fit different sized cans, and is especially adapted for use on condensed milk cans, where only a part of the contents is used at a time, and it is desired for the remainder to stay in the can until used, though the device may be employed on other cans to equal advantage.

The device comprises a substantially semi-circular closure plate 1 formed of suitable stout sheet metal having a depending, peripheral flange 2 integrally connected to the rounded edge of the same, said flange being in the form of a complete circle, of a diameter to fit the can and to easily rotate about the same. The lower portion of the flange 2 is pressed into a series of convolutions 3 to form indentations for receiving the fingers to facilitate the turning of the device about the upper end of the can for the purpose of severing the head of the can in a manner to be explained.

The straight edge of the plate 1 traverses the diametric center of the circular flange 2, and is provided at the center with an enlargement 1ª, the said plate 1 being adapted to rest upon a can top 4 which may be of any ordinary construction. Upon the under side of the plate 1 and at right angles to the straight edge thereof, there is secured, as by soldering, brazing, or riveting, an elongated plate 5, having one end turned downwardly and pointed and sharpened to provide a cutting blade 6. The blade 6 is arranged circumferentially with respect to the center of the can, and is located adjacent to the side flange 2 so that, when pressed through the can top and rotated, it will remove the major portion of the same in a well known manner. At the other end, the plate 5 is provided with a depending pin 7 having an arrow-shaped head 8 at its lower free end, which is sharpened, the same being located at the exact center of the flange 2 beneath the enlargement 1ᵃ and adapted to puncture the can top and act as a pivot to assist the surrounding flange 2 during the rotation of the device about the can to sever the top. In addition to guiding the device, the head of the pin serves to retain the severed can top 4, at the top of the can and to prevent the same from falling into the contents thereof.

Slits 9 are formed in the semi-circular plate 1 adjacent to the straight edge of the same and equidistant from the center, said slits being in alinement with each other.

A semi-circular cover or lid 10 formed of similar metal is adapted to cover the open half of the circular flange 2, and to normally rest upon the same when closed, said lid being provided on its straight edge, with spaced tongues 11 which are first bent downwardly and then rearwardly to provide offsets, as clearly shown in the drawing. These tongues are spaced apart a distance equal to the distance between the slits 9, and are adapted to be introduced into the same, the offsets in the tongues thus permitting the lid to lie flat upon the flange 2, while the extended end portions of the tongues lie against the underside of the plate 1.

The peripheral edge of the lid 10 is provided with a downwardly extending flange 12 which fits around the outside of the flange 2. Midway between the tongues 11, the straight edge of the lid is provided with an upstanding, slightly inclined thumb piece 13 which may be pressed by the thumb of the operator to raise the lid when desired, the offset portions of said tongues permitting of said movement and readily allowing the lid to drop, when released, to cover the opening in the can closure.

In using the device, the plate 1 is placed upon the top of the sealed can with the flange 2 in surrounding relation to the top edge of the same. By first pressing downwardly upon the device to cause the headed pin 7 to puncture the center of the can top 4 and to force the cutting blade 6 through the same at a point adjacent to the side wall of the can, and then by rotating the device in the manner described, it will be seen that a circular plate or disc will be severed from the can top, and that the same will be held from dropping into the can by the head 8 on the lower end of the pin 7. By raising the lid 10, as shown in Figure 2 of the drawing, the extended ends of the tongues 11 will strike the severed disc of the can top 4 which is suspended on the pin, and tilt the same in a manner to cause the edge to project through the opening formed by the semi-circular plate 1, whereupon the same may be grasped and disengaged from the pin without the necessity for removing the device from the top of the can. When a quantity of the milk or other contents of the can is desired it is only necessary to depress the thumb piece 13 to raise the lid 10 and then to tilt the can and allow the required quantity to pour out of the aforesaid opening. By releasing the pressure upon the thumb piece, the lid will immediately gravitate into closing position again, and prevent the entrance of flies or foreign matter. When it is desired to wash the lid 10, it will be seen that the formation of the hinge members 11 will readily permit removal of the same for the purpose.

From the foregoing it is believed the many advantages of the combined can opener and closure will be seen and fully understood and appreciated.

What is claimed is:—

1. A combined can opener and closure, comprising a plate adapted to rest on a can top and having means whereby it may be rotated by hand, a pin and a cutting blade depending from said plate in spaced relation to each other, said plate having an opening, a lid for closing said opening, said lid being hinged to said plate, and means carried by said lid and projecting below said plate so as to engage the top of the can when severed by said plate and tilt the top and cause it to project through said opening.

2. A combined can opener and closure comprising a plate adapted to rest on a can top and having means whereby it may be rotated by hand, cutting means carried by said plate to sever the top of the can upon rotation of the plate, said plate having an opening, a lid for closing said opening, said lid being hinged to said plate, and means carried by said lid and projecting below said plate so as to engage the top of the can when severed by said plate and tilt the top and cause it to project through said opening.

3. A combined can opener and closure comprising a flanged plate adapted to rest on a can top and having an opening arranged at one side of the center thereof and provided with means at its periphery whereby it may be rotated by hand, a central pin carried by the plate for puncturing the can head, a circumferentially arranged cutting blade depending from the plate in spaced relation to said pin, and a substantially semi-circular lid detachably hinged to the plate at one side of said opening and adapted to drop in covering relation to the opening in the plate.

4. A combined can opener and cover for the same comprising a plate adapted to rest on a can top and having an opening located at one side of the center thereof, a depending, circular flange carried by the plate and adapted to surround the can, said flange being shaped to facilitate turning the same, a centrally-disposed, headed pin provided with a can top puncturing point and depending from the plate, a cutting blade depending from the plate adjacent to its periphery, said plate having spaced, alined slits adjacent to the straight edge thereof, and a lid adapted to cover the opening in the plate and having angular tongues adapted to enter the slits to detachably hinge the lid to said plate.

5. A can opener and closure comprising a substantially semi-circular plate having a circular, depending flange and adapted to rest on a can top, a central, headed pin carried by the plate and a cutting blade in spaced relation thereto, said pin and blade being adapted to puncture and to sever the can top when the device is rotated, said plate having alined slits adjacent to its straight edge, a lid having offset tongues adapted to enter said slits and to permit the lid to rest in covering relation to the open half of the plate, an upstanding thumb piece formed at the straight edge of the lid and adapted, when depressed, to rest on the plate, to elevate the lid and to depress the free ends of the tongues within the can, said tongues acting to tilt the severed can top on the head of the pin to facilitate removal of the same through the open part of the plate.

6. A can opener and closure comprising a semicircular closure plate having a circular, depending flange connected to the edge of said plate and adapted to rest on a can and to be rotated about the same, an elongated plate having a headed and pointed pin at one end and a transverse cutting blade at the other end and secured to the underside of the closure plate in radial position thereon with the pin at the center of the circular flange, said closure plate having alined slits, a semi-circular lid provided with a thumb piece and having a depending flange around its curved edge to overhang the first-named flange when lowered, spaced tongues projecting downwardly and outwardly from the straight edge of the lid and adapted to be inserted into the slits and to lie against the underside of the closure plate when the lid is in covering position, said tongues serving to tilt the can top on the head of the pin, when the lid is elevated by pressure on the thumb piece, after the device has been rotated to sever said top.

In testimony that I claim the foregoing as my own, I have hereto affixed my signature.

ROBERT LORENZ.